United States Patent [19]

Bozhko et al.

[11] Patent Number: 4,802,654
[45] Date of Patent: Feb. 7, 1989

[54] THERMOPULSE APPARATUS FOR DEBURRING PARTS

[75] Inventors: Valery P. Bozhko; Alexei V. Losev; Mateos P. Takoriants; Viktor I. Pleshkov; Vitaly E. Strizhenko, all of Kharkov; Ivan A. Levityansky, Gatchina; Boris L. Filippov; Tamara I. Kononenko, both of Kharkov, all of U.S.S.R.

[73] Assignee: Kharkovsky Aviatsionny Institut, Kharkov, U.S.S.R.

[21] Appl. No.: 156,914

[22] PCT Filed: Apr. 30, 1986

[86] PCT No.: PCT/SU86/00040
§ 371 Date: Jan. 25, 1988
§ 102(e) Date: Jan. 25, 1988

[87] PCT Pub. No.: WO87/06513
PCT Pub. Date: Nov. 5, 1987

[51] Int. Cl.[4] .......................... C21D 9/00; B23K 7/06
[52] U.S. Cl. ........................................ 266/51; 266/261; 432/159; 432/197; 432/205
[58] Field of Search ..................... 266/48, 51, 261; 432/159, 197, 205

[56] References Cited

U.S. PATENT DOCUMENTS

| | | | |
|---|---|---|---|
| 3,475,229 | 10/1969 | Green et al. | 148/9 |
| 3,608,879 | 9/1971 | Birr et al. | 266/51 |
| 3,666,252 | 5/1970 | Rice | 432/57 |
| 4,394,007 | 7/1983 | Leisner | 266/259 |

FOREIGN PATENT DOCUMENTS 1353031 5/1974 United Kingdom.

Primary Examiner—Wayland Stallard
Attorney, Agent, or Firm—Lilling & Greenspan

[57] ABSTRACT

A thermopulse apparatus for deburring parts has a hollow body (1) housing a working chamber (2) in such a manner as to define a space (7) between the outer walls (6) thereof and inner walls (4) of the body (1) for liquid (8) partly filling the space. The chamber (2) has spark plugs (9), an inlet valve (20), an exhaust valve (12) mounted in the bottom part of the chamber (2) along the longitudinal axis (16) thereof under the layer of liquid (8), and a covermember (13) for accommodation of the parts (14) being treated, the convermember being reciprocatable within the chamber (2). Ports (23 and 32) respectively are provided in the side walls (22) of the valve (12) and in the covermember (13) on the side of the valve (12).

1 Claim, 2 Drawing Sheets

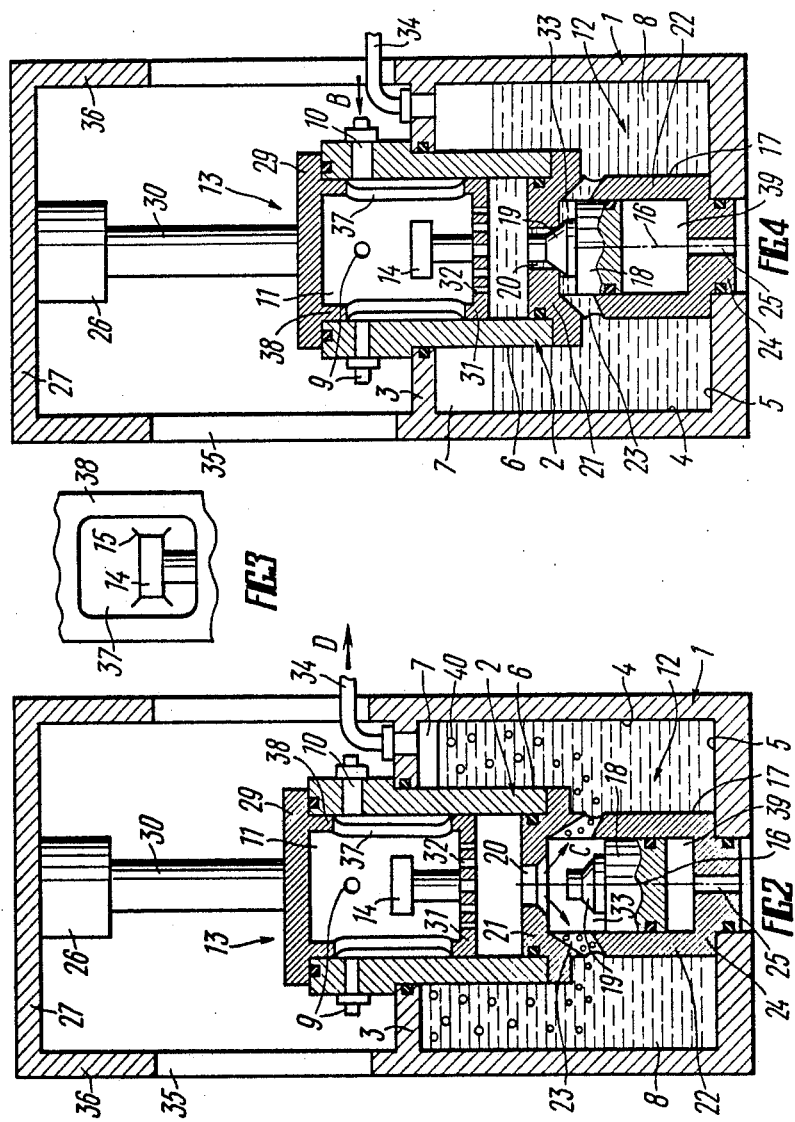

THERMOPULSE APPARATUS FOR DEBURRING PARTS

TECHNICAL FIELD

The invention relates to apparatuses for deburring parts and in particular, it deals with a thermopulse apparatus for deburring parts.

BACKGROUND OF THE INVENTION

Known in the art is a thermopulse apparatus for deburring parts, comprising a C-shaped frame having a working chamber and a table having trays for accommodating parts, the table being movable by means of hydraulic cylinder (cf. U.S. Pat. No. 3,666,252, publ. May 30, 1972).

The parts being treated are overheated in this prior art apparatus by the excessive heat of combustion products because, by virtue of the apparatus design, it is not possible to effect a rapid removal of cumbustion products from the chamber; the parts treatment cycle is 5-20 seconds longer, and a substantial deposit of combustion product particles remain on the parts after the treatment. In addition, the process of parts treatment in such apparatus is accompanied by strong noise, and pollution of the environment takes place because combustion products are not cleaned.

The abovementioned disadvantages have been partly eliminated in a thermopulse apparatus for deburring parts, comprising a frame having a working chamber housing spark plugs, an inlet valve for filling the interior of the chamber with fuel mixture, and an exhaust valve for removing combustion products from the interior of the chamber, and a cover member for accommodation of parts being treated, the cover member being mounted for reciprocations within the chamber (cf. USSR Inventor's Certificate No. 988499, Cl. B 23 K 28/00, B 23 K 7/06, publ. Jan. 25, 1983).

The exhaust valve of the prior art apparatus is mounted in the cover member of the working chamber and is to withstand the direct action of high-temperature combustion products upon ignition of the fuel mixture; when the combustion products are discharged, a gas flow containing particles of metal oxides and burnt burr material will act on the valve. Under these conditions, the valve cannot resist continuous cyclic action of these factors and has to be frequently replaced.

In addition, a loss of sealing of the valve as a result of the abovementioned factors impairs reliability and safety of the apparatus as a whole in operation because of eventual leakage of the fuel mixture.

In order to lower noise of combustion products discharged from the above described apparatus, one should provide special devices.

The present invention is aimed at the provision of a thermopulse apparatus for deburring parts in which a frame having a working chamber and an exhaust valve be made in such a manner as to make it possible to improve reliability and safety of the apparatus as a whole, to prolong service life of the exhaust valve and to lower considerably noise level during discharge of combustion products from the interior of the chamber with their concurrent cleaning from metal oxides and particles of the material of burrs being removed.

The foregoing is accomplished by that in a thermopulse apparatus for deburring parts, comprising a frame having a working chamber housing a spark plug, an inlet valve for filling the interior of the chamber with fuel mixture, an exhaust valve for discharging combustion products from the interior of the chamber, and a cover member for accommodation of parts being treated, the cover member being mounted for reciprocations within the chamber, according to the invention, the frame comprises a hollow body, the working chamber is disposed within the body so as to define a space between the inner walls of the body and outer walls the chamber partly filled with liquid, the exhaust valve is mounted in the bottom part of the working chamber to extend along the longitudinal axis thereof under the layer of liquid, the valve having ports in the side walls thereof for establishing communication between the space for liquid and the interior of the working chamber, and the cover member for accommodation of the parts being treated having ports on the side of the exhaust valve for the passage of combustion products from the interior of the working chamber through the inlet port of the outlet valve and its ports in the side walls into the space for liquid.

This construction of the apparatus according to the invention makes it possible to improve reliability of the exhaust valve, lower noise of combustion products discharge from the interior of the working chamber after the treatment and allows the combustion products to be cleaned from burnt burr material and metal oxides by causing them to pass through the liquid.

BRIEF DESCRIPTION OF THE DRAWINGS

Further, the present invention will become apparent from the following detailed description of a specific embodiment thereof with reference to the accompanying drawings, in which:

FIG. 2 is ditto of FIG. 1, in the position of discharge of combustion products;

FIG. 3 is a view taken along arrow A in FIG. 1;

FIG. 4 is ditto of FIG. 1, in the position before ignititing fuel mixture.

BEST MODE FOR CARRYING OUT THE INVENTION

Figure 1:
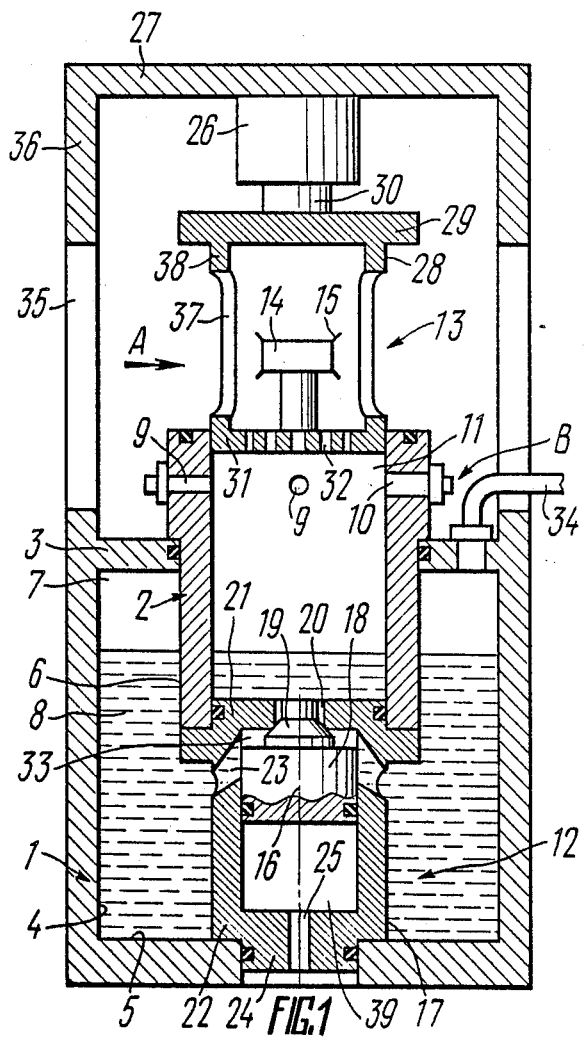
FIG. 1 shows a thermopulse apparatus for deburring parts according to the invention, in the initial position of loading (unloading) parts being treated, in longitudinal section.

A thermopulse apparatus for deburring parts according to the invention comprises a frame 1. The frame is in the form of a hollow body (FIG. 1). The body 1 accommodates a chamber 2 which is mounted by means of crosspieces 3. A space 7 is defined between inner walls 4 of the body 1, its bottom wall 5, outer walls 6 of the chamber 2 and cross-pieces 3 to contain liquid 8 partly filling the space.

The configuration of the body and chamber may be of any shape suitable for a given application.

The working chamber 2 accommodates spark plugs 9, an inlet valve 10 for filling the interior 11 of the chamber 2 with fuel mixture (as shown by arrow B), an exhaust valve 12 for discharging combustion products from the interior 11 of the chamber 2 (as shown by arrow C in FIG. 2), and a cover member 13 (FIG. 1) for accommodation of a part 14 being treated which has burrs 15 to be removed.

The spark plugs 9 and valve 10 are mounted in the chamber 2 on the side of the outer walls 6, above the cross-pieces 3.

The exhaust valve 12 is mounted in the bottom part of the working chamber 2 under the layer of liquid 8, along the longitudinal axis 16 of the working chamber.

The exhaust valve 12 comprises a hollow casing 17 housing a spool 18 having a valve member 19 received in an inlet port 20 of the valve 12 made in one of the end faces 21 of the casing 17 defining the bottom of the chamber 2. The side walls 22 of the casing 17 are made with ports 23 for establishing communication between the space 7 containing liquid 8 with the interior 11 of the chamber 2. A port 25 is provided in the other end face 24 of the casing 17 for admitting compressed air to the casing 17 of the valve 12. The end face 24 of the casing 17 is incorporated in the bottom wall 5 of the body 1.

The covermember 13 is mounted in the chamber 2 for reciprocations by means of hydraulic cylinder 26. The hydraulic cylinder 26 is secured to the upper part 27 of the body 1.

The covermember 13 comprises a hollow body 28. One end 29 of the body 28 is secured to a piston rod 30 of the hydraulic cylinder 26, and the other end 31 disposed on the side of the exhaust valve 12 has ports 32 for the passage of combustion products from the interior 11 of the chamber 2 through the inlet port 20 of the valve 12 into a space 33 above the spool 18, ports 23 of the valve 23 into the liquid 8 and further into the space 7 and a pipe 34 incorporated in one of the cross-pieces 3 and extending outside the body 1 through one openings 35 provided in side walls 36 of the body 1, the main function of the openings being to facilitate installation of the parts 14 being treated on the covermember and removal of these parts through openings 37 (FIG. 3) provided in walls 38 of the body 28 of the covermember 13.

The design of the outlet valve and covermember may be of any appropriate type.

The thermopulse apparatus for deburring parts functions in the following manner.

When the apparatus is in the initial position (FIG. 1), the covermember 13 is in the uppermost position. In this position the part 14 being treated, which has burrs 15, is installed through the openings 35 and 37 on the end face 31 of the body 28 of the cover plate 13. The spool 18 of the exhaust valve 12 is in the uppermost position and is pressed against the end face 21 of the casing 17 of the valve 12 with its valve member 19 to shutoff the inlet port 20 of the exhaust valve 12. A layer of liquid 8 is disposed above the valve 12. The piston rod 30 (FIG. 4) is moved by the hydraulic cylinder 26, and the covermember 13 carrying the part being treated is moved into the lowermost position. The end 31 of the body 28 of the covermember 13 is placed above the liquid 8. The interior 11 of the chamber 2 is filled with fuel mixture through the inlet valve 10 as shown by arrow B. When a pre-set pressure is achieved in the interior 11, the fuel mixture is ignited by the spark plugs 9.

As a result of a steep rise of pressure in the interior 11 of the chamber 2, and temperature increase, burrs 15 are burnt and/or fused on the part 14 being treated owing to their large surface area and a relatively low mass.

High-temperature combustion products containing metal oxides and burnt burr material should be evacuated from the interior 11 of the chamber 2 as soon as possible since the excessive heat of combustion products may result in overheating of the parts 14 being treated, and the particles and metal oxides may be deposited on the part 14 being treated and on the inner walls of the chamber 2 so that their further cleaning may be necessary.

The combustion products are discharged by means of the exhaust valve 12 (FIG. 2).

When compressed air supply through the port 25 into the space 39 under the spool 18 is suspended, the spool 18 is shifted into its lowermost position under the action of gauge pressure of combustion products in the interior 11 of the chamber 2.

Combustion products 40 will displace the liquid 8 above the valve member 19 through the port 20 and ports 23 and will pass through the layer of liquid 8 into the space 7. Thus the combustion products are cleaned from dust and small-size suspended particles they contain and will also give up heat and energy. Then the combustion products are removed through the pipe 34 out of the space 7 outside the apparatus as shown by arrow D. The ports 32 provided in the end 31 of the body 28 of the covermember 13 are designed for the passage of the combustion products 40 and are also capable of retaining coarse particles of burnt burrs 15 so as to protect the valve member 19 against damage.

Subsequently, the cover 13 is moved by the hydraulic cylinder 26 into its initial uppermost position shown in FIG. 1.

The apparatus according to the invention makes it possible to enlarge the range of parts being treated since the excessive heat of combustion products is not transmitted to the part being treated and is removed from the working chamber through the exhaust valve which is especially important for parts made of aluminum alloys and other similar materials. The deposit of metal oxides and particles of burr material on the parts after the treatment is reduced.

Industrial Applicability

The invention may be successfully used at mechanical engineering plants for cleaning metal and plastic parts from burrs.

We claim

1. A thermopulse apparatus for deburring parts comprising a frame having a working chamber (2) provided with spark plugs (9), an inlet valve (10) for filling an interior (11) of the chamber (2) with fuel mixture, an exhaust valve (12) for discharging combustion products from the interior (11) of the chamber (2) and a cover (13) for accommodation of parts (14) being treated being mounted for reciprocations within the chamber (2), characterized in that the frame comprises a hollow body (1), the working chamber (2) is disposed within the body (1) so as to define a space (7) between inner walls (4) of the body (1) and outer walls (6) of the chamber (2) partly filled with a liquid (8), the exhaust valve (12) is mounted in the bottom part of the working chamber (2) to extend along the longituddinal axis (16) under the layer of the liquid (8), the valve (12) having ports (23) in the side walls (22) for establishing communication between the space (7) for the liquid (8) and the interior (11) of the working chamber (2), and the cover member (13) for accommodation of the parts (14) being treated having ports (32) on the side of the exhaust valve (12) for the passage of combustion products from the interior (11) of the working chamber (2) through the inlet port (20) of the outlet valve (12) and its ports (23) in the side walls (22) into the space (7) for the liquid (8).

* * * * *